(12) United States Patent
Bruce et al.

(10) Patent No.: US 7,552,074 B2
(45) Date of Patent: Jun. 23, 2009

(54) SYSTEM AND METHOD FOR MANAGING ACCOUNT ADDRESSES

(75) Inventors: Heather Bruce, LaVista, NE (US);
Doug Stewart, Omaha, NE (US);
Margaret A. Henry, Omaha, NE (US);
Jacquelyn S. Rongish, Missouri Valley, IA (US); Gretchen L. Donlin, Gretna, NE (US); Matthew A. Rademacher, Omaha, NE (US); John L. Johnson, Omaha, NE (US); Jeffrey A. Harpenau, Omaha, NE (US); Michael B. Grear, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 307 days.

(21) Appl. No.: 11/462,268

(22) Filed: Aug. 3, 2006

(65) Prior Publication Data

US 2006/0265433 A1 Nov. 23, 2006

Related U.S. Application Data

(63) Continuation of application No. 10/119,205, filed on Apr. 8, 2002, now Pat. No. 7,099,878.

(51) Int. Cl.
*G06Q 40/00* (2006.01)
(52) U.S. Cl. .......................................... 705/35; 707/100
(58) Field of Classification Search ..................... 705/1, 705/35; 707/100
See application file for complete search history.

(56) References Cited

U.S. PATENT DOCUMENTS

| 5,648,647 | A | 7/1997 | Seiler |
| 5,999,596 | A | 12/1999 | Walker et al. |
| 6,095,413 | A | 8/2000 | Tetro et al. |
| 6,317,745 | B1 | 11/2001 | Thomas et al. |
| 6,789,189 | B2 | 9/2004 | Wheeler et al. |
| 2001/0037296 | A1 | 11/2001 | Ganesan et al. |
| 2002/0023023 | A1 | 2/2002 | Borecki et al. |
| 2002/0059430 | A1 | 5/2002 | Orbke et al. |
| 2002/0069122 | A1 | 6/2002 | Yun et al. |
| 2002/0087409 | A1 | 7/2002 | Joao |
| 2002/0095360 | A1* | 7/2002 | Joao ........................... 705/30 |

(Continued)

FOREIGN PATENT DOCUMENTS

EP 0759596 2/1997

*Primary Examiner*—Jagdish N Patel
(74) *Attorney, Agent, or Firm*—Townsend and Townsend and Crew LLP (57) ABSTRACT

A network for managing account addresses (such as for credit card accounts) where correspondence and other communications mailed to account holders may have different purposes (e.g., credit card statement, new credit card, marketing correspondence). The network has a database for storing addresses and a database management system for retrieving those addresses. A default address is provided when there is no address stored in the database for the intended purpose of a mailing. The addresses are in categories, with each category associated with a different communication purpose, and with multiple addresses in each category. The multiple addresses within each category may be permanent, temporary or repeating. If temporary or repeating, effective start and end dates are associated with the addresses. There may be multiple cardholders for each account, in which case the address categories (and multiple addresses within each category) are associated with each cardholder.

29 Claims, 3 Drawing Sheets

U.S. PATENT DOCUMENTS

| | | |
|---|---|---|
| 2002/0099635 A1 | 7/2002 | Guiragosian |
| 2002/0152272 A1 | 10/2002 | Yairi |
| 2003/0023135 A1 | 1/2003 | Ulmsten et al. |
| 2003/0097331 A1 | 5/2003 | Cohen |
| 2004/0030654 A1 | 2/2004 | Walker et al. |
| 2004/0030657 A1 | 2/2004 | Holm-Blagg et al. |
| 2005/0177563 A1 | 8/2005 | Bellamy et al. |

* cited by examiner

SYSTEM AND METHOD FOR MANAGING ACCOUNT ADDRESSES

CROSS-REFERENCES TO RELATED APPLICATIONS

This application is a Continuation of U.S. patent application Ser. No. 10/119,205, filed Apr. 8, 2002, and entitled "SYSTEM AND METHOD FOR MANAGING ACCOUNT ADDRESSES", the entire contents of which is herei incorporated by this reference for all purpose

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to managing accounts at banks, retail establishments and other commercial and non-commercial institutions, and more particularly to a system and method for managing customer addresses in connection with such accounts.

Systems for managing credit card and other financial accounts are in widespread use. These systems have become sophisticated and complex, particularly as consumers become more comfortable with on-line transactions and increase their use of credit cards. Customers now use credit cards, debit cards and similar devices to make purchases, obtain cash advances, check account balances and move cash between accounts. Transactions are conducted at point-of-sale terminals in retail stores, at automated teller machines, and over the Internet using personal computers. Many consumers have established multiple accounts, and in some cases family members each have credit cards and together may be using one or more of those accounts.

One complexity that has arisen in managing accounts (such as those for credit cards) is maintaining the appropriate addresses to which various communications to the account holder are sent. Financial institutions, for example, communicate with account holders for a number of reasons, such as sending monthly statements, mailing new account cards (when existing cards have expired), providing notice of changed conditions of use (as may be required for legal or regulatory purposes), and sending promotional literature (advertising for other products and services offered by the financial institution). If there are multiple cardholders, there may be multiple addresses to which various forms of communications are to be sent. In some cases, a customer may have one address during much of the year, and a different address during a part of the year, for example during winter months (sometimes referred to as a "snowbird" address). While existing account management systems have provided alternate addresses (for example a primary address and a different secondary address, or a correspondence address and a different billing address), such existing systems have not adequately managed the increasing frequency of multiple and changing addresses that are often associated with a single account.

BRIEF SUMMARY OF THE INVENTION

There is provided, in accordance with the present invention, a network/system and method for managing accounts and the addresses associated with those accounts, wherein communications having more than one purpose are transmitted to addresses of customers (account holders).

In one embodiment, the network includes a database and a database management system. The database has fields for storing, in relation to each account holder, a first, default address, a second address, and a third address, wherein the second and third addresses are associated with communications having different purposes. The database management system retrieves an address for a specific communication associated with one of the second and third addresses, with the database management system providing the appropriate one of the second and third address if such address is stored in the database, and providing the first address as a default if the appropriate one of the second and third addresses is not stored in the database.

In another embodiment, one purpose for transmitting communications is the transmission of a statement reflecting transactions against such account. The network includes a database having fields for storing, in relation to each account, a first, default address and a second, statement address. The system further includes a database management system for retrieving an address to which the statement is transmitted, the database management system providing the second (statement) address if the second address is stored in the database, and providing the first address as a default address if no second address is stored in the database.

The database may have further fields for storing addresses for both a primary account holder and a secondary account holder, with certain communications (such as a monthly statement) sent to an address of only one of the primary and secondary account holders. Further, the database may have fields for storing additional addresses, such as a presentation instrument (e.g., credit card or "plastic") address to which new presentation instruments are to be sent, and a letter address to which communications other than monthly statements and presentation instruments (i.e., communications such as notices regarding the account or marketing correspondence) may be sent.

In another embodiment of the invention, the database has fields for storing address types associated with stored addresses. The address type may be permanent, temporary or repeating. For temporary or repeating type, an effective date is also stored.

A more complete understanding of the present invention may be derived by referring to the detailed description of the invention and to the claims, when considered in connection with the Figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
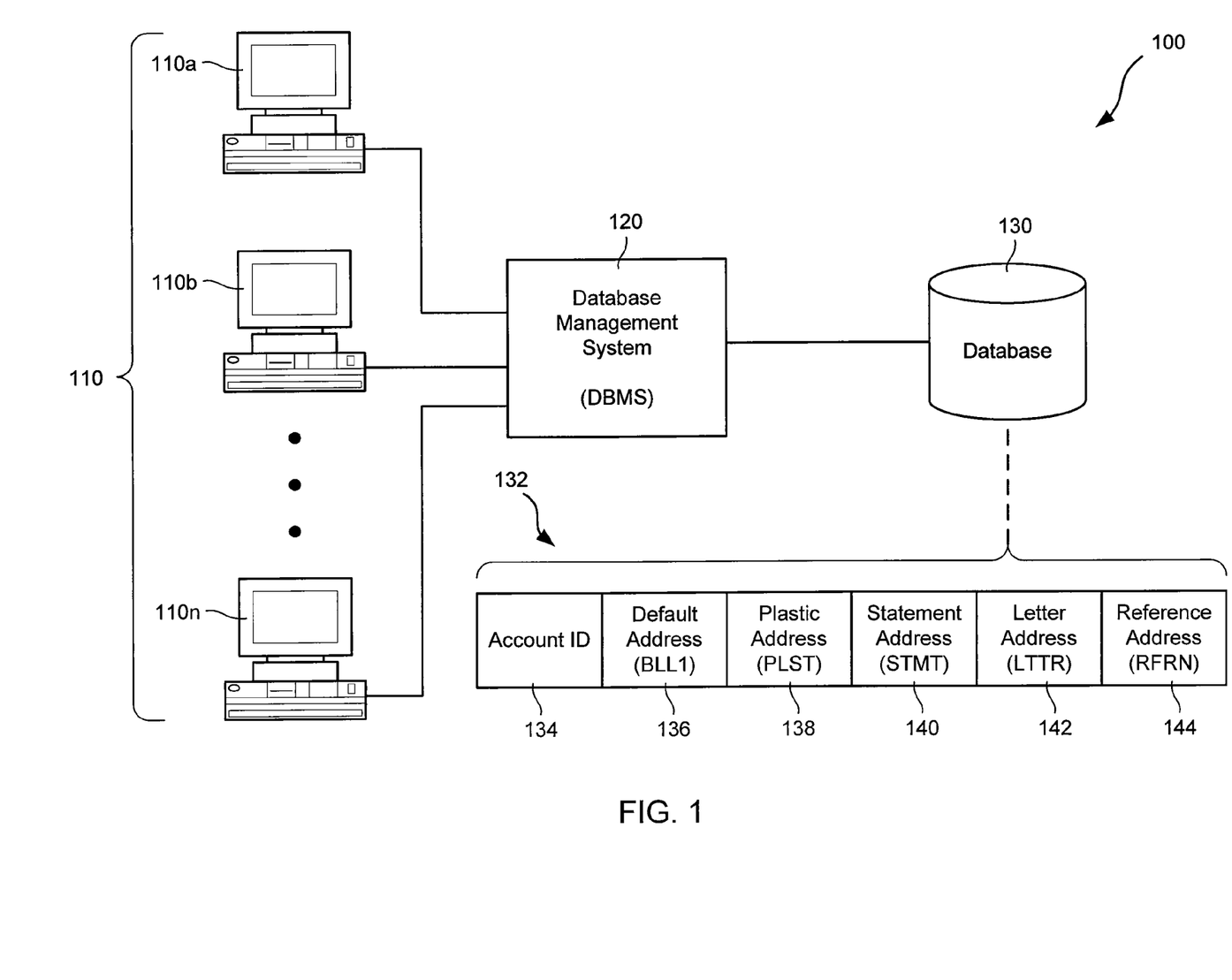
FIG. 1 is a general block diagram showing a network for managing accounts in accordance with one embodiment of the present invention.

Referring now to FIG. 1, an account management network 100 in accordance with one embodiment of the present invention is illustrated. The network 100 manages credit card accounts and has a plurality of terminals 110 (110a through 110n), a central database management system (DBMS) 120 and a database 130. The terminals 110 are used to access data in the database 130 via the DBMS 120. The terminals 110 may be point-of-sale terminals at remote retail establishments, where credit card information is read or entered, along with retail transaction data (e.g., the amount of a purchase, as well as the name of the retail establishment, date, product and other useful information). Such data can be conventionally collected, either by electronically reading data from magnetic strips on credit cards and from product UPC (uniform product code) labels, or by being manually entered by a clerk at a terminal keyboard.

The terminals 110 may also include internal workstations at a bank or other central location where the credit card accounts are managed. Those workstations would be used by employees to enter, collect, retrieve or display data in connection with setting up credit card accounts, answering customer telephone inquiries, and performing other normal financial or business functions required for operating the credit card management network 100. One of the terminals 110 could also be used to query the database for addresses to be supplied to a printer (not shown) that may, for example, print address labels on envelopes for mailing communications to card holders. As should be apparent, the kinds of communications to the cardholders will vary and may include, for example, monthly statements or bills, new cards when previous cards have expired, and various letters and notices (marketing correspondence from the card issuer, legal notices, etc.).

The DBMS 120 can be a relational database management system that permits data in the database 130 to be created, maintained, manipulated and retrieved. The database 130 is likewise relational and, as conventional, stores data in tables, with the DBMS 120 using, for example, a structured query language (SQL) in order to maintain and operate the database. While the DBMS 120 and database 130 are relational in the described embodiment, those skilled in the art will appreciate that there are many types of databases (e.g., sequential flat files, hierarchical, object oriented, etc.) that can be used within the scope of the present invention.

The network 100 as thus far described can be implemented using known architectures and systems. In addition, a network that has the underlying architecture and systems for implementing the present invention can be found in co-pending provisional U.S. Application Ser. No. 60/362,222, filed on Mar. 4, 2002, by Robert C. Guy, Diane Lyn Snider, Douglas A. Goering, Darren D. Beck, Tony D. Hames, George D. Bright, William F. Harrington, II and David G. Rivera, and owned in common with the present application such co-pending application being hereby incorporated by reference.

In FIG. 1 there is also illustrated in simplified form the general content of one database table 132 used for purposes of retrieving customer addresses in database 130. The database table 132 has a number of fields (columns) illustrated, namely, an account ID field 134, a default address (BLL1) field 136, a plastic address (PLST) field 138, a statement address (STMT) field 140, a letter address (LTTR) field 142 and a reference address (RFRN) field 144. The account ID field stores an account identifier for each account maintained by the database management system 120, and the remaining fields store address data associated with that account, each field associated with a specific category (purpose) of communications to be sent to the account holder. Thus, in populating the database, the table 132 can be thought of in its simplest form as a two dimensional table, where each account ID delineates a "row" of fields associated with a single account, and where each field delineating a "column" of addresses associated with a single category or purpose for all the accounts.

The default address (field 136) is the address to which a communication is sent by default (i.e., in the event an address is not stored in the database for one category of communication). The plastic address (field 138) is the address to which "plastic" (i.e., a credit card) is sent, such as when the existing credit card for an account has expired. The statement address (field 140) is the address to which statements (e.g., monthly account statements or bills) are sent. The letter address (field 142) is the address to which other correspondence (e.g., advertising or promotional letters, notices of changed account terms, etc.) is sent. Lastly, the reference address (field 144) is used for reference purposes and will depend on the needs or desires of the card issuer. For example, if the cardholder is behind in payments or in bankruptcy, it could be populated with the address of the attorney or other legal representative of the cardholder. Or, if card debt is secured by real property (i.e., a home equity account), it could be populated with the address of that property. As yet another example, the reference address field could be used administratively by the card issuer, i.e., when two account IDs are very close and perhaps a typographical error is introduced at data entry giving the two accounts the same account ID. The two accounts can be distinguished by the reference address (e.g. a unique string of characters representing a real or arbitrary address that are assigned to each account and that can be used as supplemental identification for the account).

The operation of the network 100 will be described in greater detail later in conjunction with FIGS. 2 and 3. However, to briefly summarize the overall operation of the network 100 in FIG. 1, when a communication is to be sent to an account holder, the database 130 is queried by the DBMS 120 for an address corresponding to the category of communication to be sent. For example, if monthly statements are to be generated and mailed, the DBMS 120 retrieves the statement address stored in field 140 of the database corresponding to each account ID, and those addresses are transmitted to one of the terminals 110 which, as mentioned earlier, may print the addresses on a mailing envelops. If a statement address is not stored in the statement address field 140 for any account, then the DBMS retrieves the default address from the field 136 for that account and transmits that default address to the terminal. A similar operation would be used to retrieve an address for mailing a credit card (plastic address), and a letter regarding changed terms of account use (letter address), with the default address used if the field 138 or 142 is not populated with data.

It should be understood that the term "address" is used in its broadest sense, i.e., to refer to any means to contact the account holder. Thus, while in some circumstances it may be merely the mailing address of the account holder, it may include other contact information, e.g., account holder name, professional title (if a business account), email address, telephone number, etc. The following Table A illustrates one example of the content and size of subfields that comprise the "address" within each of the address fields 136, 138, 140, 142 and 144 seen in FIG. 1:

TABLE A

| Content | No. of Characters |
| --- | --- |
| Address Subfields | |
| Attention | 50 |
| Address 1 (1st line) | 50 |
| Address 2 (2nd line) | 50 |
| Address 3 (3rd line) | 50 |
| Address 4 (4th line) | 50 |
| Co. Name | 50 |
| House/Bldg | 50 |
| Street Name | 50 |
| PO Box | 10 |
| City | 25 |
| Subdivision 1 | 25 |
| Subdivision 2 | 25 |
| Postal Code | 10 |
| Country | 3 |
| Name Subfields | |
| First Name | 40 |
| Middle Name | 40 |
| Last Name | 40 |
| Salutation | 1 |
| Position Title | 20 |
| Qualification (e.g., Dr., Prof., etc) | 20 |
| Prefix | 20 |
| Suffix | 20 |
| Preferred Name | 40 |
| Phone Subfields | |
| Home Phone | 19 |
| Bus. Phone | 19 |
| Fax Phone | 19 |
| Mobile Phone | 19 |
| Pager Phone | 19 |
| Other Phone | 19 |
| Email Home | 19 |
| Email Work | 19 |

The card issuing institution, depending on the needs of the institution and its customers, determines whether to populate any one or more of the above subfields for any address in any one or all of the address categories or fields shown in FIG. 1 ("default", "plastic", "statement", "letter" and "reference"). Further, it should be apparent from the forgoing that communications to the account holder could be by email (rather than postal mail) using one of the email subfields, or could even be by telephone (with the number retrieved and displayed at a terminal, and a customer service representative using the retrieved telephone information to make telephone contact with the account holder).

Also, although not specifically illustrated in FIG. 1, there may be multiple account holders for any account. For a family, there might be an account usable by all family members, for example, with one parent being a primary account holder (and having principal financial responsibility) and other family members being secondary account holders. For a business account, an employee might be the primary account holder, and the employer may be a secondary account holder. In the case of an account with multiple account holders, each account holder could have any one or more or all of the address category fields shown in FIG. 1 populated (i.e., "primary", "plastic", "statement", "letter" and "reference"). The database table in such case would not only have addresses related to account IDs as seen in FIG. 1, but also addresses related to each account holder of that account.

Figure 2:
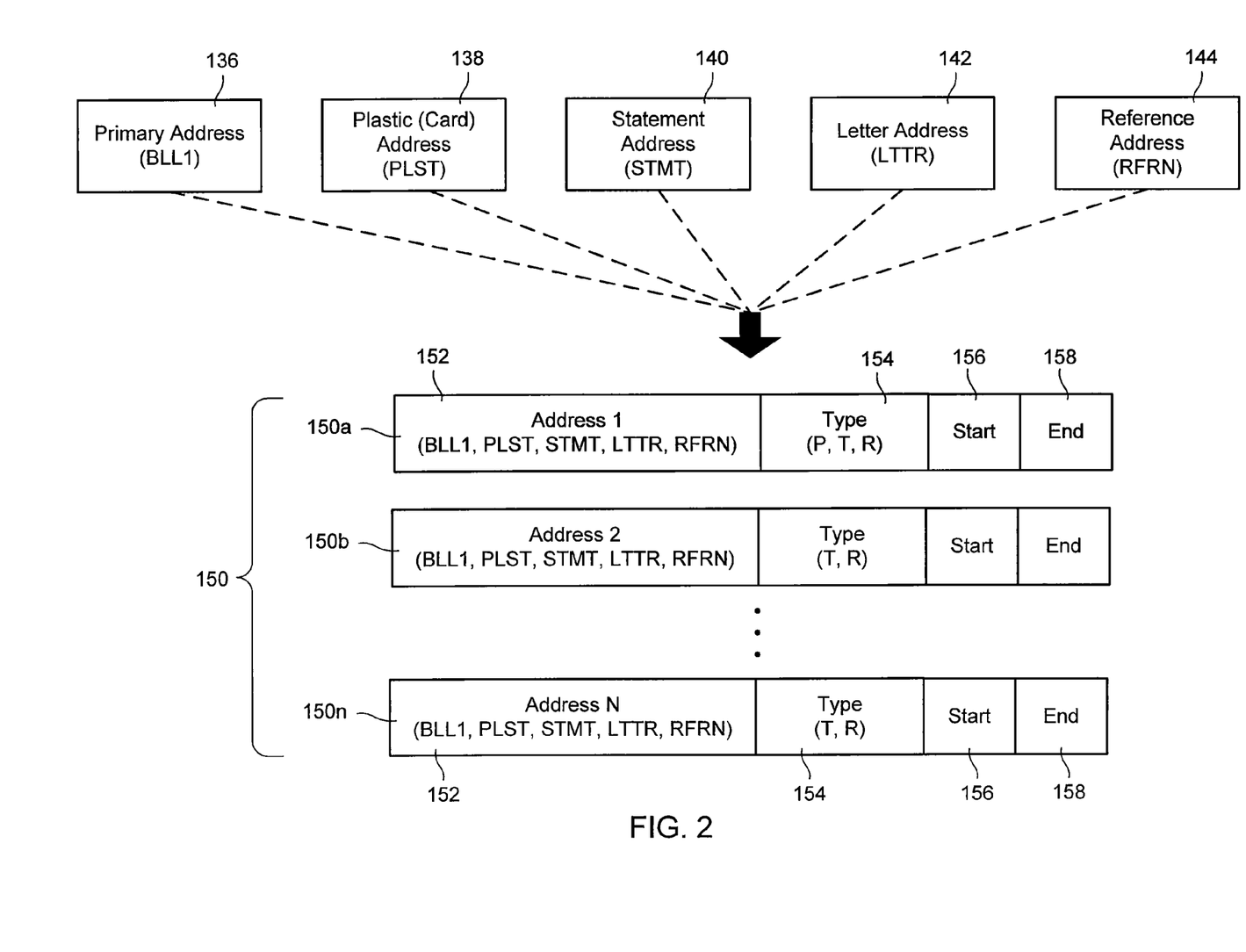
FIG. 2 illustrates a table within the database of FIG. 1.

FIG. 2 illustrates a further embodiment of the present invention, wherein each address category (such as the "default", "plastic", "statement", "letter", and "reference" address fields seen in FIG. 1) may each further comprise multiple addresses. As will be described shortly, this arrangement is useful when the addresses for the account holder may change, for example, when he or she is in the military and temporarily stationed away from a permanent address, or when the account holder resides for part of the year at a "snowbird" address that repeats itself at the same time or interval (such as during the winter months every year).

Referring to FIG. 2, each of the address category fields (default address 136, plastic address 138, statement address 140, letter address 142 and reference address 144) may include a plurality of individual addresses 150 (individually designated 150a through 150n). The addresses 150 each have an address field 152 for address data (i.e., address data such as that seen in Table A above), an address type field 154 for indicating whether the address is permanent (P), temporary (T), or repeating (R), and a field 156 for the starting date and a field 158 for the end date in order to define the effective period of the address. In the illustrated embodiment seen in FIG. 2, only the first address 150a can be designated as permanent in type field 154, since an account holder would normally have only a single permanent address, with any other address being either temporary or repeating. In such case, the start and end date fields 156, 158 for address 150a would be left empty.

In alternative embodiments, it could be useful to have more than one address marked as permanent, for example, if a cardholder is moving from a permanent address, and he or she notifies the card issuer in advance of the move, the current permanent address can be populated with an end date, and the future permanent address can be populated with a start date (the effective date of the move). This not only permits the system to automatically change a "permanent" mailing address when it becomes effective (start date), but also old addresses to be kept in archives for some specified period of time following the address change (end date).

In using the network 110, and as one example of where multiple addresses would be useful, a cardholder may be temporarily residing away from his/her permanent address because of a temporary job or military assignment. The address 150a would be the permanent address, with field 154 marked as "P". The address 150b would be a temporary address, with the type field 154 marked as "T". The start and end date fields at address 150a would not be populated (since it is a permanent address), and the start and end date fields at address 150b would be populated with the beginning date and the ending date of the temporary address. When the DBMS 120 retrieves an address, it checks each of the addresses 150a and 150b (within the appropriate address categories 136 through 144), and if there is a temporary address indicated in any type field 154, the DBMS checks the start and end dates for that address to determine if the date of mailing is within the effective period or date. If so, that temporary address at address 150b is used. If not within the effective dates, it uses the permanent address 150a.

As another example, the cardholder may have a "snowbird" address during the winter months, and a permanent address during the remainder of the year. In such case, the address 150a stores the permanent address at its field 152, with field 154 marked as "P". Address 150b has the snowbird address stored at its address field 152, with field 154 marked as "R", and the start and end dates (which are the same dates every year) are stored in the start and end date fields 156 and 158. When the DBMS retrieves an address, it checks address 150b, and if there is a repeating address indicated at type field 154, it checks the start and end dates to determine if the date of mailing is within the effective period. If it is, the repeating address is used. If not, the permanent address 150a is used.

While the forgoing two examples use a permanent address 150a and only one temporary or repeating address 150b, it should be apparent that any number of temporary or repeating addresses could be used (up to and including "address n"). However, for obvious reasons, the card issuer may want to limit the number of temporary and repeating addresses so that the clerical burden of managing the addresses within the database 130 does not become difficult. Also, as noted earlier, the term "address" (e.g., address 1 through address n) may encompass a wide range of customer information beyond a postal mailing address (see, as an example, Table A above).

Figure 3:
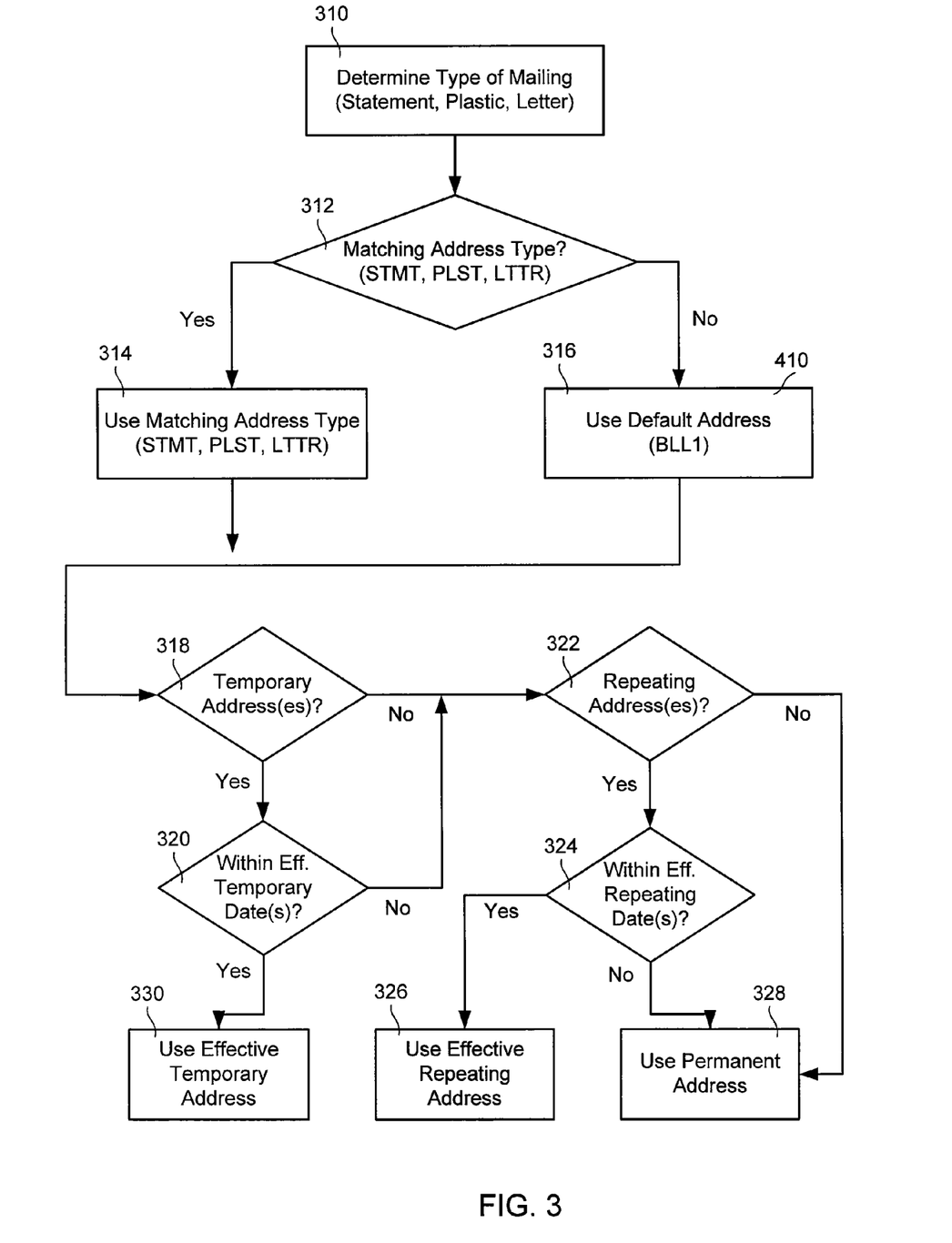
FIG. 3 is a flow diagram illustrating the retrieval of an address by the database management system in FIG. 1.

FIG. 3 illustrates the retrieval of an address within the database 130, when there are multiple address categories (e.g., statement—"STMT", plastic—"PLST" and letter—"LTTR") associated with each account ID.

At step 310, the DBMS system determines the type of mailing, i.e., the address category (STMT, PLST, LTTR) that is to be used. If there is an address for that purpose, that address (and its associated fields 152 through 158) is used (accessed), step 314. If not, the DBMS uses the default address (BLL1). The system then determines if the address (or addresses) to be used within each of the address categories is temporary (step 318) by checking for a "T" in the address type field 154 of each address 150a through 150n (see FIG. 2). If any address is temporary, the system determines whether the transmission or mailing date is within the effective dates of the temporary address (step 320) by accessing fields 156, 158, and if it is, that effective temporary address is used for the mailing (step 330). If, at step 318, there are no temporary addresses, or if at step 320 the mailing date is not within the effective date of any temporary address, then the system goes to step 322 and determines if there are any repeating addresses (by checking for an "R" in field 154 of each address).

If there are one or more repeating addresses at step 322, then the system determines if any one of those addresses is effective (step 324) by checking the fields 156, 158, and if so, that effective repeating address is used (step 326). If no repeating address is effective, or if there is no repeating address found in the database at step 322, then the address within the database that is marked as permanent (in field 154) is used.

In the forgoing description in connection with FIG. 3, it is assumed (for ease of description) that there is only one account holder for each account. In fact, there may be more than one account holder in actual account managing networks and systems. In such case, there may be multiple address categories (BLL1, STMT, PLST, LTTR), one associated with each account holder and, within each account category, there may be multiple addresses (150a-150n). The database 130 may be structured to also store an indicator or marker for each account holder, such marker indicating whether that account holder is to receive the type of communication being mailed. Thus after the system determines the type of mailing (step 310), the DBMS checks the data base for each account holder to determine whether he/she is to receive that mailing, and if so, goes through the remaining steps of FIG. 3 for that account holder.

Further, while only five address categories (BLL1, STMT, PLST, LTTR, RFRN) are illustrated in the network 100, other address categories might be useful to the card issuer or cardholders For example, there might be a separate address for sending pin (personal identification number) codes (to permit cash withdrawals at ATMs), with the address being separate from the PLST address either for security reasons or because the cardholder is temporarily away from the address to which the card was originally mailed.

While the network 100 is described as one for managing credit card accounts, it should be appreciated that the present invention could be employed for managing any kind of accounts. As one example of equivalents, the accounts may involve other types of presentation instruments (e.g., debit card, ATM card, customer ID) that are used to conduct financial or other transactions, either in person or on-line. Further, the account may not involve a tangible presentation instrument at all, but rather may simply be one entry in an address book of contact information, such as what one entity might use to periodically communicate with other entities (e.g., customers, employees, suppliers, or other people or businesses), and where there may be more than one purpose for communicating (and hence the need for more than one address for each entity).

Also, while embodiments of the present invention have been illustrated in connection with managing addresses for credit card holders, it should be appreciated that the invention could also be used in connection with managing the accounts of merchants that accept credit cards and other presentation instruments. Such merchant accounts are maintained by the card issuer to enable a merchant (the account holder) to accept credit cards or other presentation instruments in payment for goods or services, and then obtain the appropriate funds from the card issuer by presenting transaction tickets to the financial institution for settlement. The financial institution sends various categories of communications to the merchant/account holder, such as monthly account statements, chargeback notices (when a credit card issuer refuses payment on a transaction ticket), marketing materials, legal notices, and so on. The merchant may desire to have different categories of communications sent to different addresses, e.g., monthly statements (reflecting all credit card activity at the merchant's business that month) to the accounting department or an outside accountant, legal notices to the legal department, and so on. One of ordinary skill in the art will appreciate that the systems and methods described above are readily adaptable to this purpose.

Further, in managing merchant accounts, it may be especially useful to provide the ability to associate multiple addresses with each category of communications so that a copy of the communication can be sent to each of a number of business units or associates of the merchant. For instance, a merchant may desire to have one copy of the monthly statement sent to its own financial department and a second copy to an outside accountant. Or a merchant that is part of a chain of stores may desire to have copies of some or all categories of communications sent to chain headquarters in addition to its own location. The embodiments disclosed above can easily be adapted so that multiple addresses may be designated in the database table for some or all categories of correspondence. When a communication is generated, multiple addresses may be retrieved by the DBMS and used to generate multiple copies of the communication, each directed to a different address.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A computerized system for managing account addresses, wherein communications concerning the account and for more than one purpose are transmitted to account holders, the system comprising:
- a database having fields for storing, in relation to each account, data representing addresses for use in transmitting communications to the account holder including
  - a first, default account address,
  - a second account address, and
  - a third account address,
  - wherein the first, second and third addresses stored in relation to each account are all associated with that single account, wherein the second and third addresses are associated with account communications having different purposes, wherein the field for storing the first default address in relation to each account is populated with data, and wherein the fields for storing the second and third addresses in relation to each account may not be populated with data; and
- a database management system for retrieving an address for a specific communication associated with one of the second and third addresses, the database management system providing the one of the second and third addresses associated with the specific communication if such address is stored in the database, and providing the first address as a default if the one of the second and third addresses associated with the specific communication is not stored in the database.

2. The system of claim 1, wherein one of the second and third addresses is associated with a purpose of transmitting a statement to the account holder.

3. The system of claim 2, wherein the other of the second and third addresses is associated with a purpose of transmitting a presentation instrument to the account holder.

4. The system of claim 3, wherein the presentation instrument is a credit card.

5. The system of claim 1, wherein the database further has a field for storing in relation to each account holder a fourth account address, the fourth address associated with a communication having a purpose different than the purpose of the communications associated with the second and third addresses.

6. The system of claim 5, wherein the fourth address is associated with a purpose of transmitting correspondence to the account holder.

7. The system of claim 1, wherein there are plural account holders associated with each account, and wherein the database further has fields for storing at least one of the first, second, and third addresses for each account holder, and wherein the database management system determines whether communications associated with the second and third addresses are to be sent to more than one of the account holders.

8. The system of claim 7, wherein the plural account holders include a primary account holder and at least one secondary account holder, wherein the primary account holder has a primary financial responsibility for the account, wherein one of the second and third addresses is associated with a purpose of transmitting a statement to the account holders, and wherein the database management system always transmits such statement to the primary account holder by using one of the first, second and third addresses associated with the primary account holder.

9. The system of claim 1, wherein the account is a merchant account for processing presentation-instrument transactions.

10. The system of claim 9, wherein the presentation instrument is a credit card.

11. The system of claim 1, wherein the database further has a field for storing in relation to each account holder a fourth account address, the fourth address associated with a communication having the same purpose as the purpose of the communication associated with the second address.

12. The system of claim 11, wherein the database management system provides the fourth address in addition to the second address when the specific communication is associated with the second address.

13. The system of claim 12, wherein the communication is sent to each of the second and fourth addresses.

14. A computerized system for managing account addresses, wherein communications for more than one purpose are transmitted to account holders, wherein one of the purposes is the transmission to an account holder of a statement reflecting transactions for such account, and wherein another of the purposes is the transmission to an account holder of a presentation instrument, the system comprising:
- a database having fields for storing in relation to each account
  - a first, default account address,
  - a second, statement account address,
  - a third, presentation instrument account address, and
  - an address type associated with at least one of the second and third addresses, for indicating whether or not the associated address is a permanent address;
  - wherein the field for storing the first default address is populated with data, and wherein the field for storing the second and third addresses may not be populated with data;
- a database management system for retrieving at least one of the second and third addresses, the database management system providing the address to be retrieved if stored in the database, and providing the first address as a default if the address to be retrieved is not stored in the database.

15. The system of claim 14, wherein the presentation instrument is a card.

16. The system of claim 15, wherein the card is a credit card.

17. The system of claim 14, wherein the database further has a field for storing in relation to each account holder a fourth, letter account address, and wherein correspondence other than the statement to be transmitted to the account holder is transmitted to the letter account address.

18. The system of claim 14, wherein communications are transmitted by mail.

19. The system of claim 14, wherein communications are transmitted electronically and wherein at least one of the addressees includes an electronic address.

20. The system of claim 14, wherein the electronic address is an email address.

21. The system of claim 14, wherein the address type in the address type field indicates whether an associated address is temporary, wherein the database further has a field for storing an effective date period for any address that is temporary, and wherein the database management system provides the address with an address type of temporary if the date of transmission is within the effective period.

22. The system of claim 14, wherein the address type in the address type field indicates whether an associated address is repeating, wherein the database further has a field for storing an effective date period for any address that is repeating, and wherein the database management system provides the address with an address type of repeating if the date of transmission is within the effective period.

23. A computerized system for managing account addresses, wherein communications relating to an account are transmitted to account holders having plural addresses and wherein at least one of the addresses is not permanent, the system comprising:

a database for storing in relation to each account
- a plurality of addresses, each address used for a communication to the account holder and each relating to that single account, but each address used for an account communication having a different purpose, and
- an effective date for any one of the addresses that is not permanent; and a database management system for retrieving an address from the database for use in transmission of an account communication to an account holder, the database management system comparing the date of transmission to the effective date stored in the database for any address that is not permanent, and providing that address if the date of transmission and the effective date match, and providing another address if the date of transmission and the effective date do not match.

24. The system of claim 23, wherein an address that is not permanent is a temporary address having an effective date defined by a start date and an end date.

25. The system of claim 23, wherein an address that is not permanent is a repeating address having an effective date that repeats itself at a predetermined intervals.

26. The system of claim 25, wherein the effective date is defined by a start date and an end date and wherein the predetermined intervals are annual.

27. The system of claim 26 wherein the effective date extends for a period of time during the winter months.

28. The system of claim 23, wherein the database further stores an address type for each of the addresses for indicating whether or not the address is permanent.

29. The system of claim 28 wherein the address type indicates whether the address is one of permanent, temporary and repeating.

* * * * *